(12) United States Patent
Chandra et al.

(10) Patent No.: US 9,031,407 B2
(45) Date of Patent: May 12, 2015

(54) BIDIRECTIONAL OPTICAL DATA PACKET SWITCHING INTERCONECTION NETWORK

(71) Applicant: Indian Institute of Technology, Delhi, New Delhi (IN)

(72) Inventors: Vinod Chandra, New Delhi (IN); Devi Chadha, New Delhi (IN); R. G. Sangeetha, New Delhi (IN)

(73) Assignee: Indian Institute of Technology, Delhi, New Delhi (IN)

( * ) Notice: Subject to any disclaimer, the term of this patent is extended or adjusted under 35 U.S.C. 154(b) by 81 days.

(21) Appl. No.: 13/727,002

(22) Filed: Dec. 26, 2012

(65) Prior Publication Data

US 2013/0209102 A1 Aug. 15, 2013

(30) Foreign Application Priority Data

Dec. 27, 2011 (IN) .............................. 3831/DEL/2011

(51) Int. Cl.
| | |
|---|---|
| *H04J 14/00* | (2006.01) |
| *H04Q 11/00* | (2006.01) |
| *H04L 12/64* | (2006.01) |
| *H04J 14/02* | (2006.01) |

(52) U.S. Cl.
CPC ........ *H04Q 11/0066* (2013.01); *H04L 12/6418* (2013.01); *H04Q 11/0062* (2013.01); *H04Q 2011/0073* (2013.01); *H04Q 2011/009* (2013.01); *H04J 14/0212* (2013.01); *H04J 14/0265* (2013.01); *H04J 14/0267* (2013.01); *H04J 14/0273* (2013.01)

(58) Field of Classification Search
CPC .......... H04Q 11/0001; H04Q 11/0005; H04Q 11/0062; H04Q 11/0066
USPC .......................................... 398/45–48, 51, 54
See application file for complete search history.

(56) References Cited

U.S. PATENT DOCUMENTS

| | | | | |
|---|---|---|---|---|
| 2002/0041727 | A1* | 4/2002 | Zami et al. ..................... | 385/16 |
| 2003/0133641 | A1* | 7/2003 | Yoo ................................. | 385/14 |
| 2005/0089027 | A1* | 4/2005 | Colton ........................... | 370/380 |
| 2008/0219268 | A1* | 9/2008 | Dennison ................... | 370/395.2 |
| 2009/0169205 | A1* | 7/2009 | Bergman et al. ............... | 398/45 |

* cited by examiner

*Primary Examiner* — Dzung Tran
(74) *Attorney, Agent, or Firm* — Knobbe Martens Olson & Bear LLP

(57) ABSTRACT

The present disclosure discloses data vortex architecture with bidirectional links in which the packets are routed both in forward as well as in reverse directions through a single node. The disclosed arrangement avoids any packet congestion in the network and improves the BER characteristics.

21 Claims, 8 Drawing Sheets

BIDIRECTIONAL OPTICAL DATA PACKET SWITCHING INTERCONECTION NETWORK

CROSS-REFERENCE TO RELATED APPLICATION

This application claims the benefit of priority to Indian Application Number 3831/DEL/2011, filed Dec. 27, 2011, which is hereby expressly incorporated by reference in its entirety.

FIELD OF THE INVENTION

The present disclosure relates to optical packet interconnection networks and more specifically to, a bidirectional optical packet switching nodes.

BACKGROUND

Optical packet interconnection networks provide possible solutions for interchip communications bottleneck, especially, in high-performance computing systems (HPCS). However, the main challenge in the design of next-generation HPCS is the communication between processors and memory elements which are not able to address the latency, scalability, and through-put requirements.

Contemporary processors are capable of working at giga-floating-point operations per second (GFLOPS), and high-speed memory elements can be written and read at data rates of hundreds of gigabits per second. It is well recognized that the performance bottleneck is shifting towards the data exchange medium between processors and memory elements in multi-processor systems. Increasing the pin count of electronic integrated circuits is becoming more demanding, while growing data rates lead to increased power consumption of communication chips and greater difficulty in transmitting high-speed electronic signals over distances of tens of meters. These factors clearly render future electronic interconnection networks complex to design and expensive to manufacture. Fiber-optic technology offers a preferable transmission medium for multiprocessor HPCS interconnects. Optical packet switching fabrics provides high performance characteristics necessary for efficient communications between supercomputer processor, memory and storage elements.

The data vortex is one optical packet network designed specifically for large-scale processor-memory interconnections. Most large-scale optical packet switches include the data vortex, share the semiconductor optical amplifier (SOA) as the central active optical switch component. Semiconductor optical amplifiers (SOAs) offer substantial gain, low latency, and relatively uniform gain. They have, therefore, been utilized as switching gates in optical packet switching (OPS) networks. It has been shown that wavelength division multiplexing (WDM) optical packets can be transmitted through many SOAs while maintaining sufficient signal integrity.

Data Vortex Switching Node

The node structure has two input ports and two output ports. At each input port, a small portion of optical power is tapped off by a coupler to decode the header and frame information. The payload data is transparent and switched by the SOAs. The header and frame bits are converted into electronic signals and, along with the electronic input control signal from the inner cylinder node, are processed in the node control board. Accordingly, driving signals are generated to switch the SOAs on or off. In the meantime, a control signal to the outer cylinder is also generated. The total latency, from the input port to output port, is approximately 4.3 ns.

"A fully implemented 12×12 Data Vortex Optical Packet Switching Interconnection Network" published paper in Journal of Lightwave Technology Vol. 23, October 2005, provides a fully implemented data vortex OPS interconnection network. It demonstrates complete packet routing functionality from 12 input ports to 12 output ports for data packet containing eight payload wavelengths modulated at 10 Gb/s each, with median latencies of approximately 115 ns, while maintaining a bit error rate (BER) of $10^{-12}$ or better.

However, it is a cumbersome process to implement multi-stage data vortex network and its associated hardware for high performance computing requirements. Data Vortex (DV) is essentially a synchronous unidirectional switch with packets moving in the forward direction. It provides data flow only in one direction. In order to have a bidirectional operation with DV switch, one will require two data vortex interconnection networks connected in parallel, for both forward and reverse operations. Generally, the optical devices are bi-directional so as to increase the throughput and utilize the channel capacity but when implemented with uni-directional data vortexs (DVs) the number of nodes and other optical components are doubled, thereby, reducing the overall throughput of the system.

FIG. 1 discloses one such bidirectional data vortex (BDV) setup by means of two data vortex interconnection networks connected in parallel. Each node has to be duplicated for bidirectional operation. Each node acts as a bidirectional node by connecting 1×2/2×1 switches outside the node setup. A control unit outside the node is required to control the forward and reverse directional operation of 1×2/2×1 switch. The switches and control unit at each node is adequate because DV switch provides a distributed control switch and not centrally controlled switch. Also extra fibers are required to connect the SOA switches and 1×2/2×1 switches connected outside the node. However, there is not much improvement in the BER characteristics, throughput latency, fault tolerance and reliability of this BDV switch.

Therefore, there is a need to develop efficient bidirectional Data Vortex architecture with bidirectional links in which the packets are routed both in the forward as well as in the reverse directions.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose is to present some concepts of the subject matter in a simplified form as a prelude to the more detailed description that is presented later.

It is therefore a primary objective of this disclosure to provide an improved BER characteristics throughput latency, fault tolerance and reliability in an optical packet switching interconnection network.

The object of this invention is to provide the feasibility of data flow through a single node both in the forward as well as in the reverse directions.

Another object of the invention is to simplify the architecture of optical packet switching interconnection network in regard to its structure and to avoid the above mentioned disadvantages.

In accordance with the invention that objects is attained by an optical packet switching interconnection network having the feature set forth in claims. Advantageous developments described in the further claims.

According to the preferred embodiment, the present disclosure discloses data vortex architecture with bidirectional links in which the packets are routed both in forward as well as in reverse directions through a single node.

According to another preferred embodiment, a bidirectional optical packet switching interconnection network, said network comprising one or more optical switching nodes with bidirectional links, each of which comprises forward input 301a and reverse output 301b optical data packet flow ports and reverse input 301b and forward output 302b optical data packet flow ports; a switching unit 303 operatively coupled to said optical switching nodes to route said optical data packet flow both in forward and reverse direction; and an electronic processing unit 304 operatively coupled to said optical switching nodes and said switching unit to execute the routing of the optical data packets both in forward and reverse directions based on extracted control signals.

According to another preferred embodiment, a method for bidirectional optical packet switching, said method comprising: providing one or more optical switching nodes with bidirectional links, each of which comprises forward input 301a and reverse output 301b optical data packet flow ports and reverse input 301b and forward output 302b optical data packet flow ports; selecting the switching direction to route said optical data packet flow both in forward and reverse direction; and executing the routing of the optical data packets both in forward and reverse directions based on extracted control signals.

BRIEF DESCRIPTION OF THE DRAWINGS

For a better understanding of the embodiments of the systems and methods described herein, and to show more clearly how they may be carried into effect, reference will now be made, by way of example, to the accompanying drawings, wherein.

DETAILED DESCRIPTION OF PREFERRED EMBODIMENTS

Figure 1:
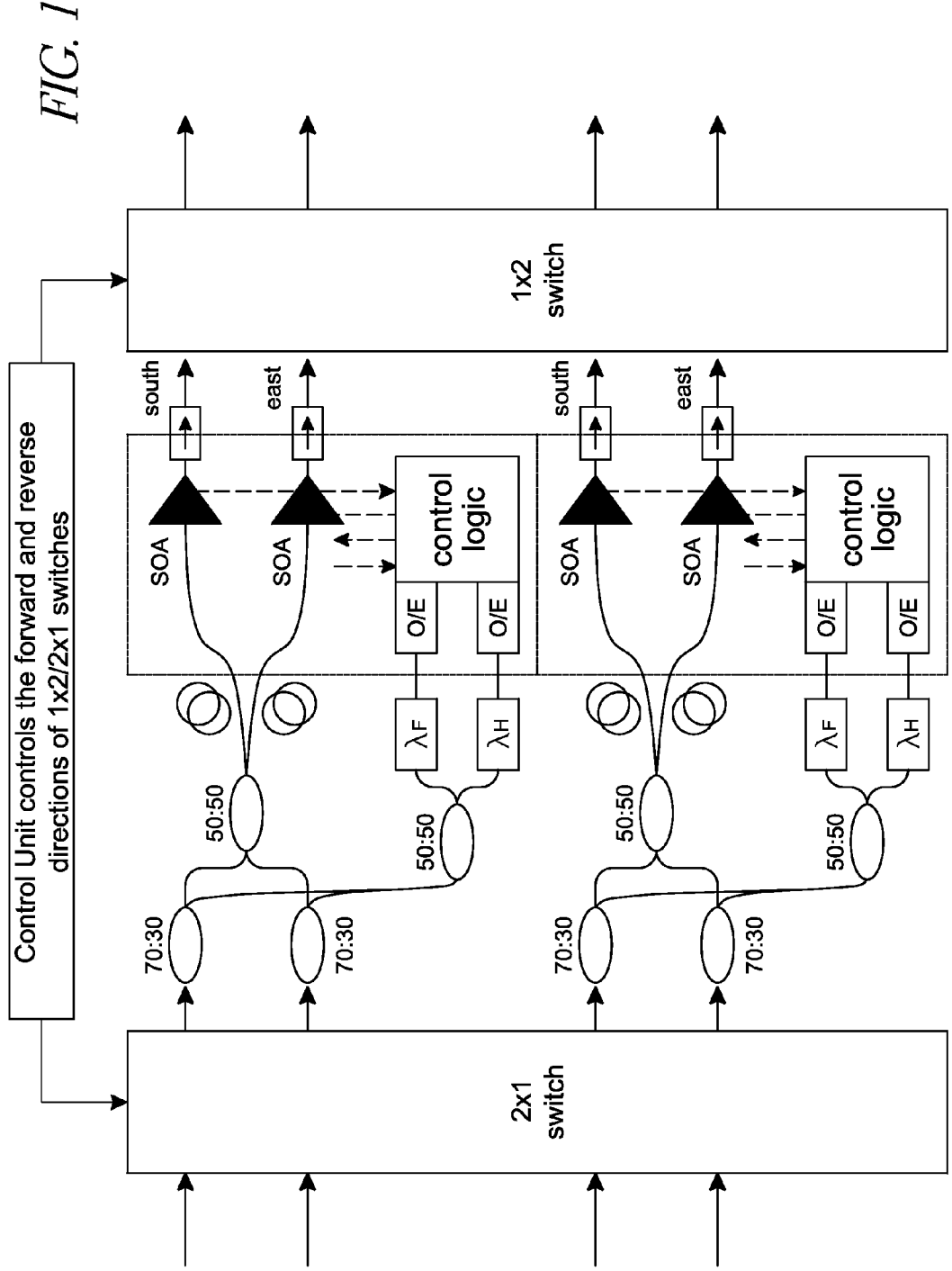
FIG. 1 illustrates a bidirectional operation setup according to the prior art.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

Figure 2:
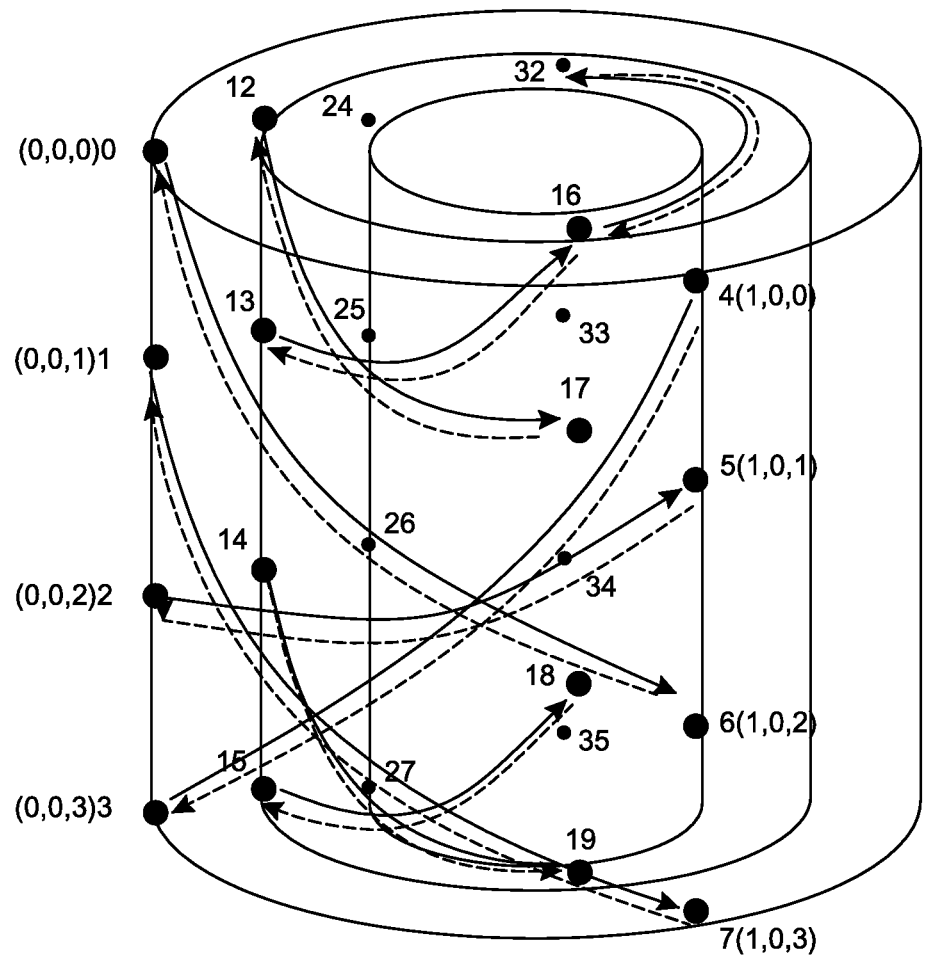
FIG. 2 illustrates the schematic of bidirectional routing paths of the Bidirectional data vortex.

FIG. 2 illustrates the schematic of bidirectional routing paths of the Bidirectional data vortex. A data vortex switching fabric is defined by three topological parameters: C, the number of cylinders; H, the number of nodes along a cylinder height (i.e. the cylinder height); and A, the number of nodes along a cylinder circumference (i.e. the angle). In the given figure, C=3, H=4, and A=3, with height crossing patterns of the three cylinders. Curved solid lines are deflection fibers carrying the packets in the forward direction, and dotted lines are deflection fiber carrying packets in the reverse direction on the same cylinder. Thus, two fibers connect the nodes to carry the packets both in the forward and in the reverse directions, respectively.

Switching nodes are interconnected using a set of ingression fibers, which connect nodes of the same height in adjacent cylinders, and deflection fibers, which connect nodes of different heights within the same cylinder. The ingression fibers must be of the same length throughout the entire system, as must be the deflection fibers.

Figure 3:
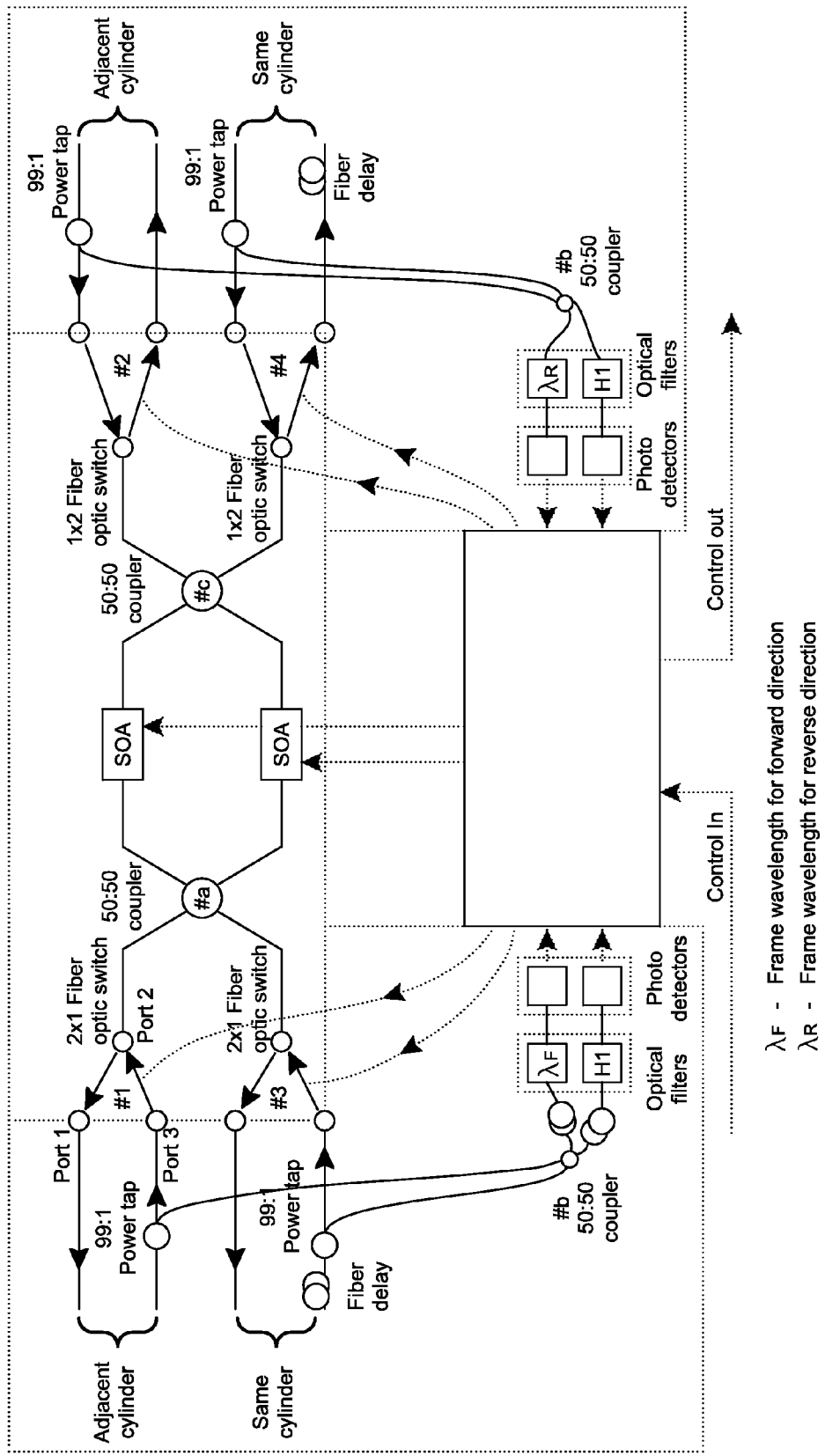
FIG. 3 implements the hardware of a bidirectional data vortex switch according to the preferred embodiment of the present disclosure.

FIG. 3 implements the hardware of a bidirectional data vortex switch according to the preferred embodiment of the present disclosure. In Bidirectional Data Vortex, each node has two input ports and two output ports, labeled as adjacent cylinder and same cylinder in both the directions. The packets move from one cylinder to the adjacent cylinder to reach its destination. Each node has four ports: forward input 301a and reverse output 301b data flow ports and reverse input 301b and forward output 302b data flow ports, a switching unit 303, and an electronic signal processing (ESP) unit 304. The forward and reverse ports are connected to a common ESP and switching units. Each of the data flow unit has optical power taps with a pair of optical fiber links for forward and reverse data flow, a coupler, an optical filter, and a photo detector. The switching unit includes a pair of 2×1 and 1×2 high speed optical switches, couplers and two SOA switches. The ESP unit 304 includes high speed minimum electronic circuitry such as detection unit 305 that detects the isolated control wavelengths; and a signal extraction unit 306 that controls and processes the signals based on the frame and header information of the data.

Further, the switching unit 303 comprises a plurality of optical switches; one or more couplers; and one or more semiconductor optical amplifiers (SOAs) that execute the routing and compensate for coupling losses.

The optical data packet can enter from any of the direction through either of the ports. As a packet enters the node through the power tap, 1% of the power is used to monitor the header bits and 99% of the power is used to send the data packets to its destined output port. In both the directions, for H=4 and A=3, each incoming packet has five header wavelengths required to route the packets to the destination level. The frame bit ($\lambda_F$, $\lambda_R$) is encoded in a unique wavelength to indicate the presence of data packets. The other four header bits are encoded in four different wavelengths; $H_0$, $H_1$, $H_2$, $H_3$ which carry the packet destination address. Two header wavelengths $H_0$ and $H_1$ are to identify the height address of the first and the second cylinder respectively, and the header wavelengths $H_2$ and $H_3$ are to identify the angle resolution in the third cylinder. In the first and second cylinders, the frame and header wavelengths are filtered and directed to photo detectors. Two unique wavelengths are used in the frame bit to indicate the forward and reverse directions. The wavelength indicates the desired direction and the filtered frame bit '1' indicates the presence of the data in the packet. If the data is present, then according to the wavelength, the appropriate direction of data flow is chosen by sending the electronic signal to all the four (2×1 and 1×2) fiber optic switches from the ESP unit 304. Next, the filtered address header bit is matched against the most significant bit of the node's binary height address. If the bit matches then the packet is routed to the adjacent cylinder link. If the height does not match then the packet is sent to the same cylinder link. In the third cylinder, the two header wavelengths $H_2$ and $H_3$ are extracted and matched against the destination angle.

Figure 4:
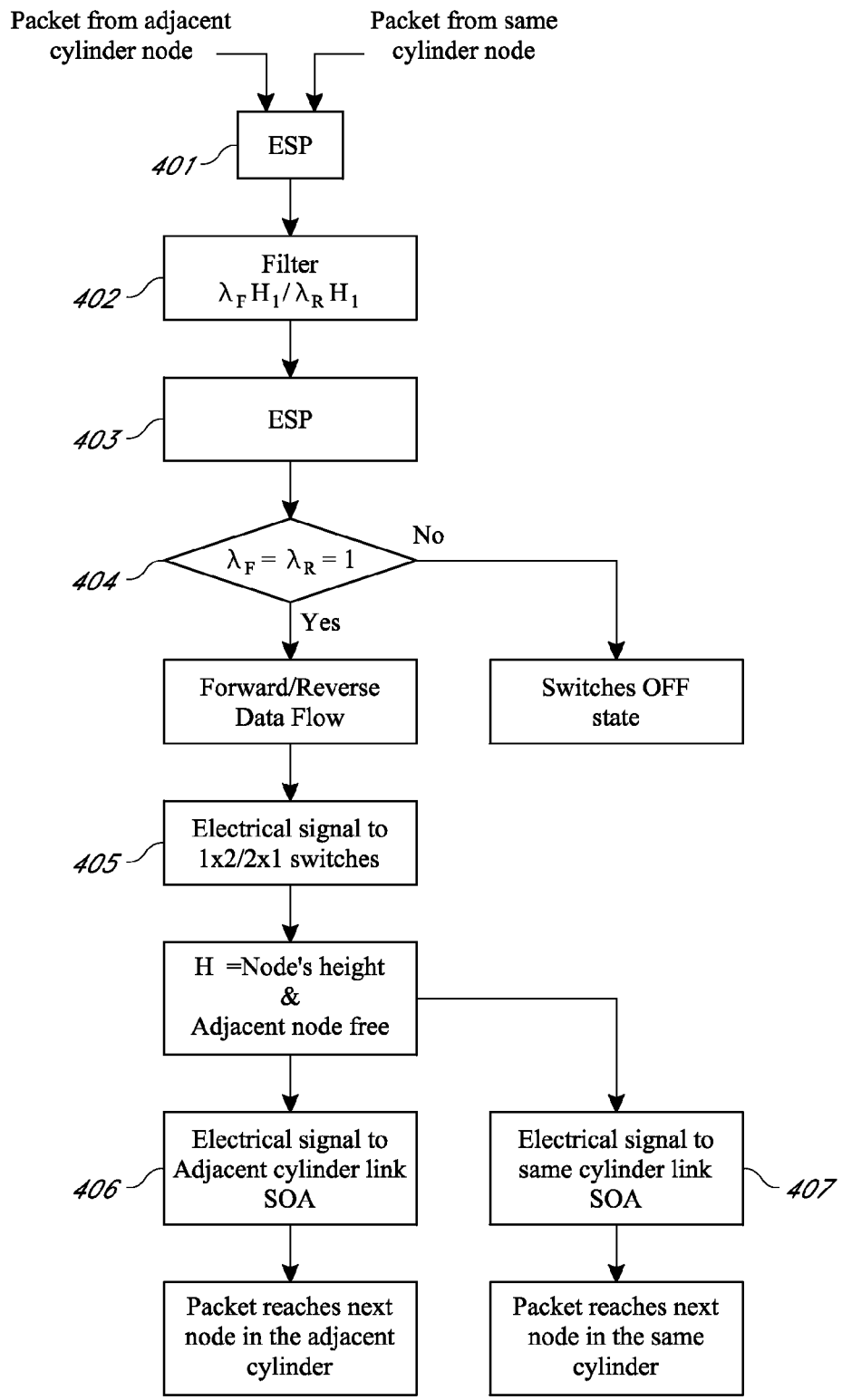
FIG. 4 illustrates a flow chart for bi-directional optical data flow as per preferred mode of routing according to the present disclosure.

FIG. 4 illustrates a flow chart for bi-directional optical data flow as per preferred mode of routing according to the present disclosure. In step 401, the packet enters either from adjacent cylinder link or from same cylinder link from any one direction in a node. In step 402, the relevant header bits are filtered and sent to ESP unit 304. In step 403, ESP unit processes the filtered frame bit $\lambda_F$ (for forward direction), $\lambda_R$ (for reverse direction) and the header bit $H_1$. In step 404, if $\lambda_F=1$, then the direction of data flow is in the forward direction, else if $\lambda_R=1$ then the direction of data flow is in the reverse direction else if both $\lambda_R=\lambda_F=1$ then the direction is chosen alternatively. After selecting the desired direction, in step 405 the electrical signals are sent to 1×2 and 2×1 switches. In step 406, the header bit $H_1$ is matched with node's height address, if it matches and the adjacent cylinder link is free then the current data packets are given to adjacent cylinder link SOA. In step 407, if the height does not match or the adjacent cylinder link is not free then the current data packets are given to same cylinder link SOA. As the network size increases, the number of header bits also increase (Header bits=$\log_2 H$). At every node the corresponding header bits are processed in the ESP unit.

In bidirectional data vortex (BDV), the same deflection routing rules are applied as in DV. In forward direction, as the packet moves from the outer cylinder to the inner cylinder, each node receives packet from two neighboring nodes, one on the same level and other on the outer adjacent cylinder. While in the reverse direction, as the packet moves from inner cylinder to outer cylinder, each node receives packet from the two neighboring nodes, one on the same level and other on the adjacent inner cylinder. Therefore, in BDV each node has four neighboring nodes. Contentions are avoided by sending the control signals to all the neighboring nodes suitably.

Accordingly, the present invention discloses a bidirectional operation with a single ESP unit and a set of SOA, where the packets have to be sent through the node in only one direction in one time slot to avoid contention. Also, for the packets moving in a particular direction, priority is given to the packet moving on the same cylinder over the packets moving to the adjacent cylinder.

Figure 5:
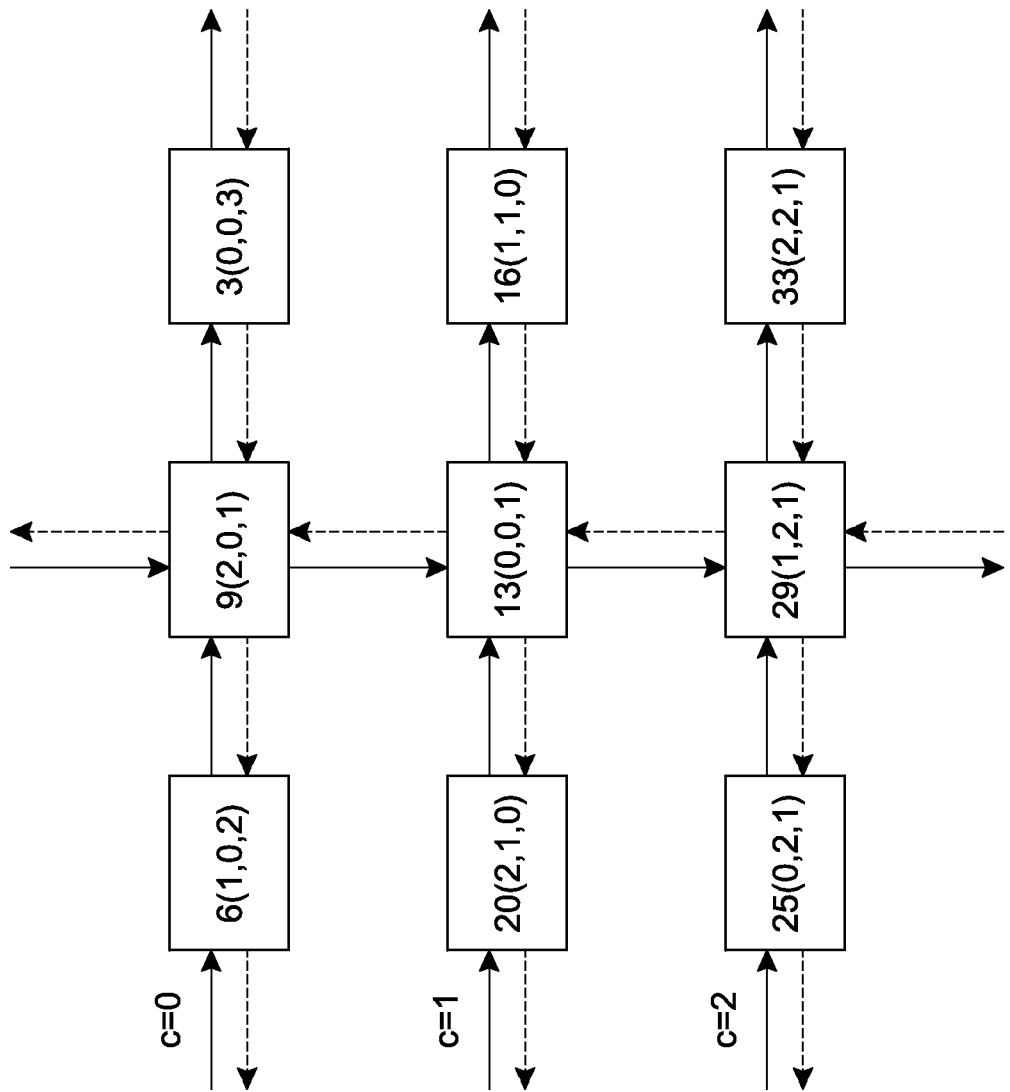
FIG. 5 illustrates control mechanism and priority scheme for the data flow according to the present disclosure.

FIG. 5 illustrates control mechanism and priority scheme for the data flow according to the present disclosure. As the data flow is bidirectional, the packets are sent through the node in only one direction in one time slot to avoid contention. Also, for the packets moving in a particular direction, priority is given to the packet moving on the same cylinder over the packets moving to the adjacent cylinder. As shown in the figure, Node 13 receives data from node 9 (adjacent level (c=0)), node 20 (same cylinder level (c=1)) in forward direction, and node 29 (adjacent level (c=2)), node 16 (same cylinder level (c=1)) in reverse direction. Whenever node 20 has to send the packet to node 13 in the forward direction the frame and header bit are extracted in the ESP unit 304. The wavelength of the frame bit indicates the desired data flow direction. The control signal is generated and sent to all the neighboring nodes. The electronic deflection signal is sent to node 9 (adjacent level (c=0)). If node 9 simultaneously receives the packet to be sent to node 13 in the same time slot, then due to received electronic signal the packet from node 9 is deflected to another node 3 in c=0 level. This prevents the packet from moving to node 13. If node 29, simultaneously receives the packet which is also to be sent in the reverse direction to node 13 in the same time slot, then the packet is deflected to another node 25 in c=2 level. In the situation when node 16 in the reverse direction has to send the packet to node 13 in the same time slot then the packet is delayed for one time slot in the fiber delay line of the same cylinder link. The delayed packet is sent after the processing of packet of node 20. Similar arrangement is followed throughout the network to avoid contention.

Figure 6:
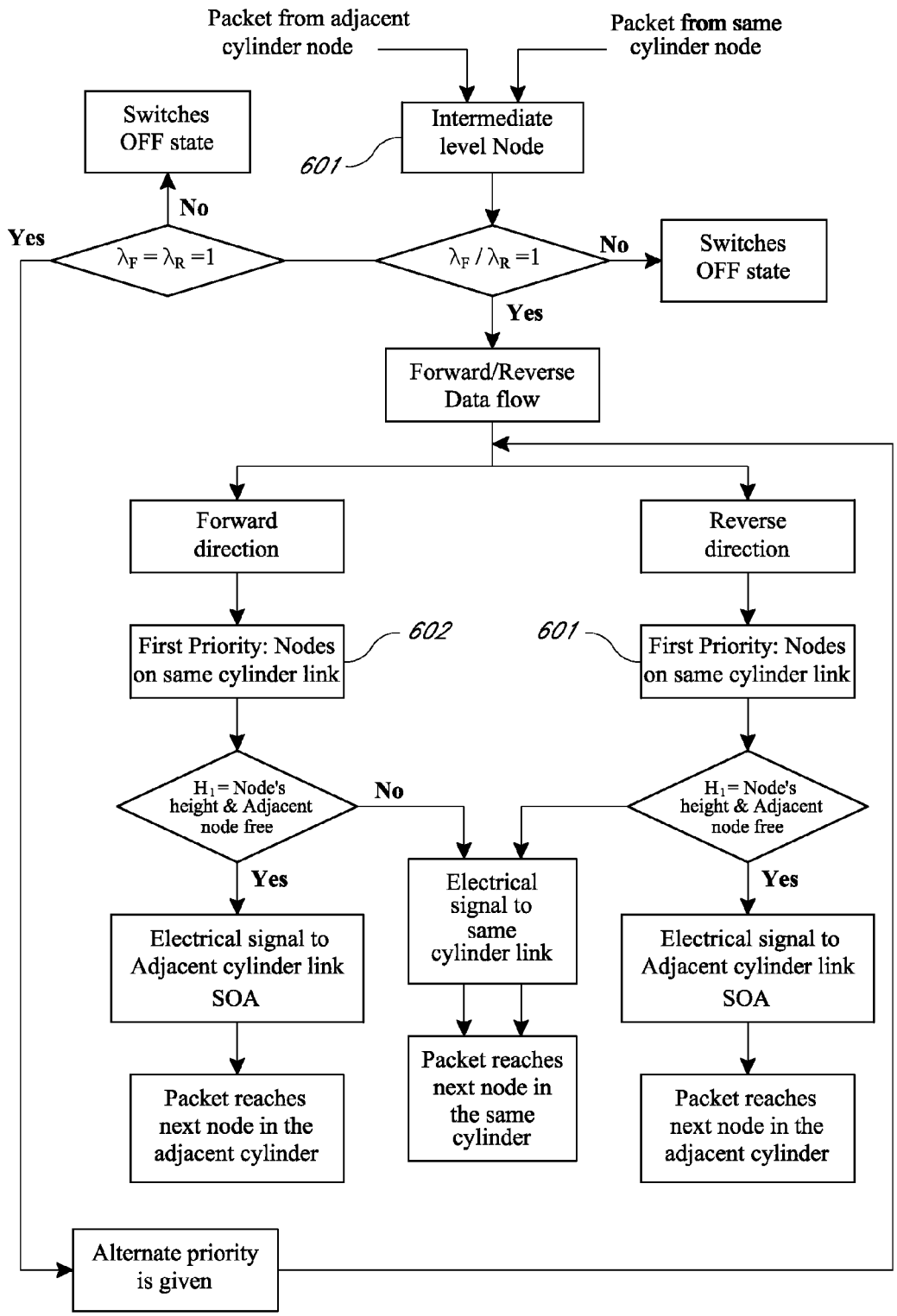
FIG. 6 illustrates a flow chart depicting control mechanism and priority scheme for the data flow according to the present disclosure.

FIG. 6 illustrates a flow chart depicting control mechanism and priority scheme for the data flow according to the present disclosure. The control mechanism gives the priority scheme for switching of slots alternatively for bi-directional data flow. As the packet can enter from any two links (adjacent cylinder link/same cylinder link) from two directions (forward/reverse direction), therefore, the priority scheme ensures that there is no contention between the nodes. In step 601, any node in the intermediate cylinder level (Node 13) can receive the packet from the same cylinder node in both forward and reverse direction (Node 20/Node 16)) or from the adjacent cylinder node (Node 9/Node 29), respectively. In step 602, considering the node receives the packet from the forward direction and, if both the same cylinder node (Node 20) and the adjacent cylinder node (Node 9) have the packets to be sent to next node (Node 13) then the first priority is given to the same cylinder node (Node 20), meanwhile the adjacent cylinder node (Node 9) is allowed to deflect its packet to its own level (Node 3). Similarly in step 603, for reverse direction, if both the same cylinder node (Node 16) and the adjacent cylinder node (Node 29) have the packets to be sent to next node (Node 13) then the first priority is given to the same cylinder node (Node 16), meanwhile the adjacent cylinder node (Node 29) is allowed to deflect its packet to its own level (Node 25). Further, if both the same cylinder nodes and adjacent cylinder nodes (Node 20 and Node 16/Node 9 and Node 29) have the packets simultaneously then the switching slots are chosen alternatively to decide the direction of data flow. The packet which is not processed is allowed to delay for one time slot in the fiber delay line.

The effect of hardware assessment and verification of bidirectional data vortex was investigated by network simulations carried out for a single BDV node. The block mode simulation allows for simulating each block independently using the user defined values. The header and payload wavelengths are generated by the laser sources and are modulated with 10 Gb/s pseudo-random bit sequence (PRBS) and external modulators. The frame wavelength for the forward and reverse direction is chosen as 1530 nm and 1550 nm, respectively. The five wavelengths span from 1530 nm to 1534.8 with 0.8 nm spacing. One percent of the optical power is tapped for monitoring purpose in the ESP unit. At each node the frame and the address header bit are extracted using optical band pass filters and sent to the photo detectors. In the ESP unit 304, frame bit is tested to identify the presence of data bits and the direction of the data flow. If the data is present, then the frame bit is sent to priority checker which is a part of control and processing unit. If the frame bit is detected in only one direction then electronic signal is sent to all the four (2×1 and 1×2) fiber optic switches. If the frame bit is detected in both the directions, the header bit processing is allowed in one direction and the packet is delayed for one time slot in the other direction as shown in FIG. 6, Alternate priority is followed to decide the direction of data flow. Thus in BDV, packets from both the directions will not enter simultaneously at a particular time slot. The address header bit is compared with the binary node address. If it matches then it checks for electronic control input. If the control input signal is present then the electronic trigger is given to the corresponding SOA. The above mentioned node design is maintained throughout the network. About 70 such nodes are cascaded and bit error rate is noted after each node. The results indicate the potential physical layer scalability of the bidirectional data vortex to port counts relevant for high performance computing interconnection networks. The performance of BER against number of cascaded SOAs both in the forward and reverse direction is shown in FIG. 7 and FIG. 8 respectively.

Figure 7:
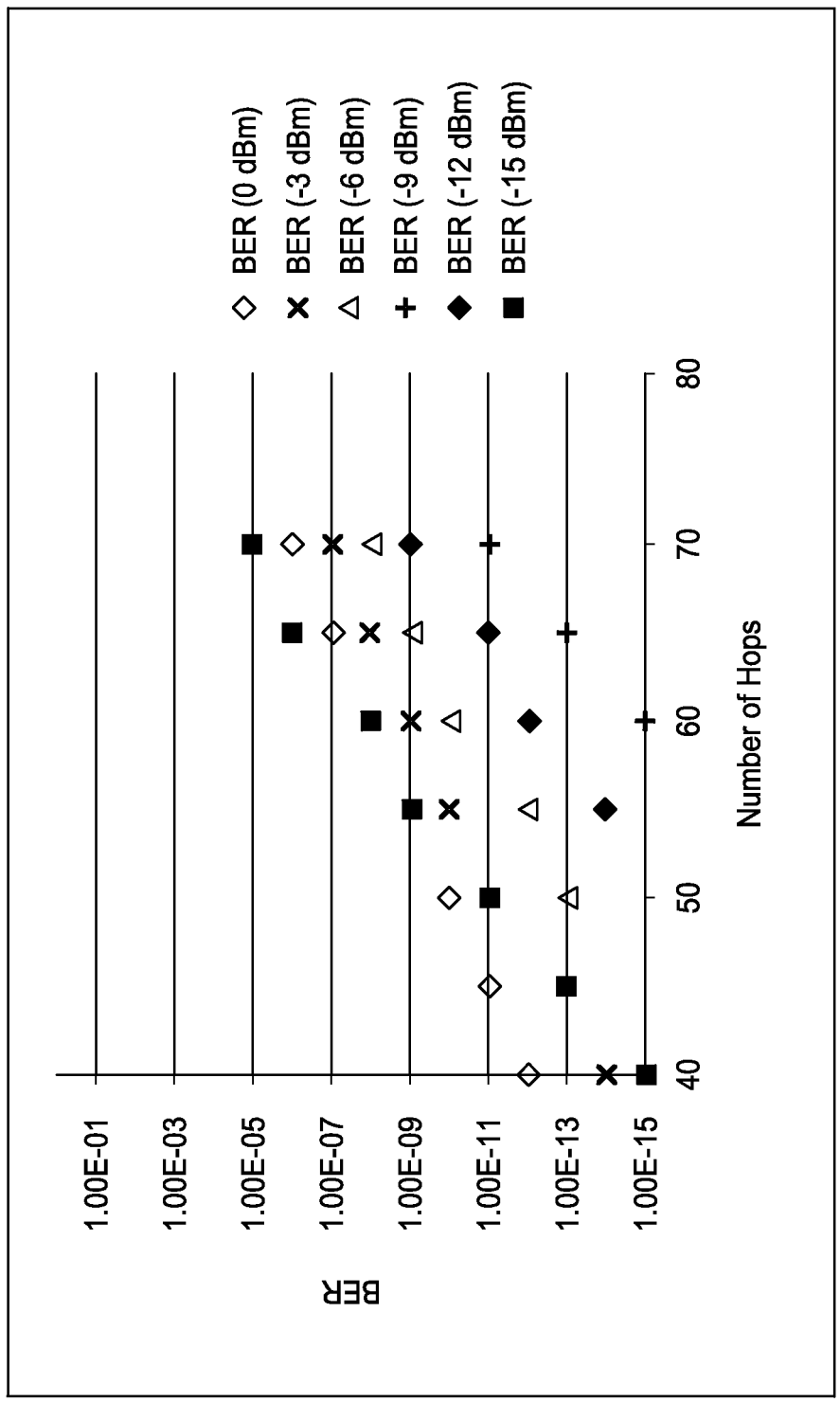
FIG. 7 illustrates the performance of BER against number of cascaded SOAs in the forward direction.

FIG. 7 illustrates the performance of BER against number of cascaded SOAs in the forward direction.

Figure 8:
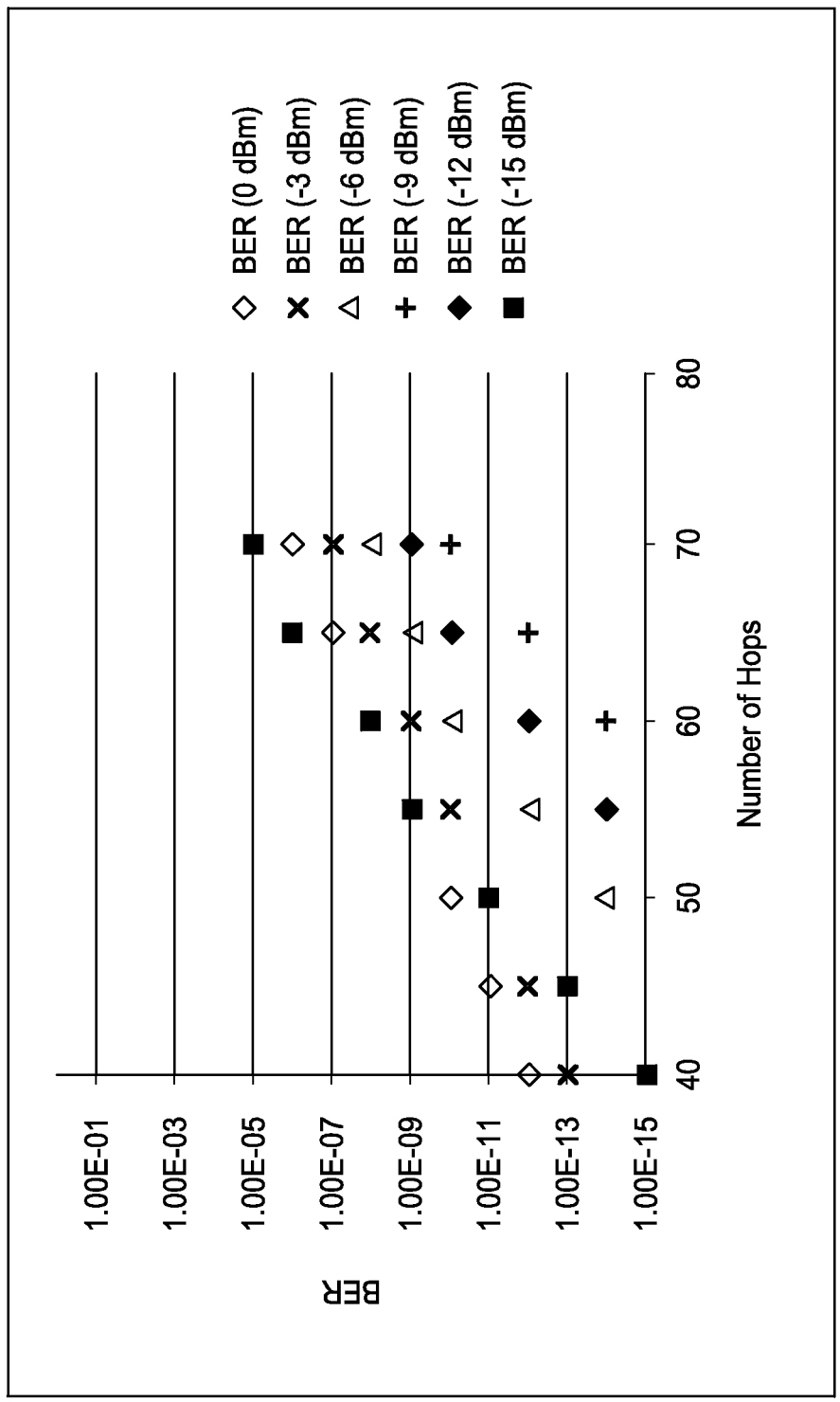
FIG. 8 illustrates the performance of BER against number of cascaded SOAs in the reverse direction.

FIG. 8 illustrates the performance of BER against number of cascaded SOAs in the reverse direction.

In an advantageous embodiment, the disclosed system demonstrates their versatility in terms of simplicity and near constant BER Characteristics obtained in both directions. It was found with through further intensive investigations that such system provides improved performance that BDV switch operates better than the alternate bidirectional setup reduced complexity.

It will be apparent to those having ordinary skill in this art that various modifications and variations may be made to the embodiments disclosed herein, consistent with the present disclosure, without departing from the spirit and scope of the present disclosure. Other embodiments consistent with the present disclosure will become apparent from consideration of the specification and the practice of the description disclosed herein.

What is claimed is:

1. A bidirectional optical packet switching interconnection network, said network comprising:
   one or more optical switching nodes with bidirectional links, each of which comprises forward input and reverse output optical data packet flow ports and reverse input and forward output optical data packet flow ports;
   a switching unit operatively coupled to said optical switching nodes to route said optical data packet flow both in forward and reverse direction; and
   an electronic processing unit operatively coupled to said optical switching nodes and said switching unit to execute the routing of the optical data packets both in forward and reverse directions based on extracted control signals, wherein, when a node of said optical switching nodes is sent two of said optical data packets in the same time slot, the node is configured to delay one of said optical data packets by one time slot.

2. The network as claimed in claim 1, wherein said switching unit comprises:
   a plurality of optical switches;
   one or more couplers; and
   one or more semiconductor optical amplifiers (SOAs) that execute the routing and compensate for coupling losses.

3. The network as claimed in claim 1, wherein said electronic processing unit comprises:
   a detection unit that detects the isolated control wavelengths; and
   a signal extraction unit that controls and process the signals switching based on the extracted wavelength of frame and header information of the data.

4. The network as claimed in claim 3, wherein said switching prioritizes the optical packets moving on the same cylinder over the packets moving to the adjacent cylinder.

5. The network as claimed in claim 3, wherein said extracted wavelength of the frame bit indicates the desired data flow direction.

6. The network as claimed in claim 1, wherein said bidirectional link comprises two optical fibers connecting nodes to carry the packets both in the forward and in the reverse directions.

7. The network as claimed in claim 6, wherein said optical fibers comprise one cylinder to the adjacent cylinder to reach its destination.

8. The network as claimed in claim 1, wherein said optical data packets are sent through the node only in one direction, in one time slot.

9. The network as claimed in claim 1, wherein said optical data packets are allowed on all ports, on detection of said frame bit only in one direction.

10. The network as claimed in claim 1, wherein said optical data packets comprising header bits are allowed in one direction and the packet is delayed for one time slot in another direction, on detection of said frame bit in both the directions.

11. The network as claimed in claim 1, wherein said packets from both the forward and reverse directions are not allowed to enter simultaneously at a particular time slot.

12. A method for bidirectional optical packet switching, said method comprising:

providing one or more optical switching nodes with bidirectional links, each of which comprises forward input and reverse output optical data packet flow ports and reverse input and forward output optical data packet flow ports;

selecting the switching direction to route said optical data packet flow both in forward and reverse direction; and executing the routing of the optical data packets both in forward and reverse directions based on extracted control signals, wherein, when a node of said optical switching nodes is sent two of said optical data packets in the same time slot, the node is configured to delay one of said optical data packets by one time slot.

13. The method as claimed in claim 12, wherein said bidirectional links comprises two optical fibers connecting nodes to carry the packets both in the forward and in the reverse directions.

14. The method as claimed in claim 13, wherein said optical fibers comprise one cylinder to the adjacent cylinder to reach its destination.

15. The method as claimed in claim 12, wherein said optical data packets are sent through the node only in one direction, in one time slot.

16. The network as claimed in claim 12, wherein said switching prioritizes the optical packets moving on the same cylinder over the packets moving to the adjacent cylinder.

17. The method as claimed in claim 12, wherein said switching is based on the extracted wavelength of frame and header information of the data.

18. The method as claimed in claim 17, wherein said extracted wavelength of the frame bit indicates the desired data flow direction.

19. The method as claimed in claim 12, wherein said optical data packets are allowed on all ports, on detection of said frame bit only in one direction.

20. The method as claimed in claim 12, wherein said optical data packets comprising header bits are allowed in one direction and the packet is delayed for one time slot in another direction, on detection of said frame bit in both the directions.

21. The method as claimed in claim 12, wherein said packets from both the forward and reverse directions are not allowed to enter simultaneously at a particular time slot.

* * * * *